(12) United States Patent
Michaelson

(10) Patent No.: US 8,864,573 B2
(45) Date of Patent: Oct. 21, 2014

(54) GAMING WITH FEE-TYPE WAGERING

(75) Inventor: Richard E. Michaelson, Lemmon Valley, NV (US)

(73) Assignee: IGT, Las Vegas, NV (US)

( * ) Notice: Subject to any disclaimer, the term of this patent is extended or adjusted under 35 U.S.C. 154(b) by 397 days.

(21) Appl. No.: 12/785,907

(22) Filed: May 24, 2010

(65) Prior Publication Data

US 2010/0234086 A1    Sep. 16, 2010

Related U.S. Application Data

(62) Division of application No. 10/056,550, filed on Jan. 25, 2002, now abandoned.

(51) Int. Cl.
*G07F 17/32* (2006.01)

(52) U.S. Cl.
CPC ............ *G06F 17/3262* (2013.01); *G06F 17/32* (2013.01)
USPC .................. 463/25; 463/16; 463/17; 463/18; 463/19; 463/20

(58) Field of Classification Search
USPC ................................................ 463/25, 16–20
See application file for complete search history.

(56) References Cited

U.S. PATENT DOCUMENTS

| | | | |
|---|---|---|---|
| RE35,864 E | 7/1998 | Weingardt | |
| 5,823,879 A | 10/1998 | Goldberg et al. | |
| 5,851,011 A | 12/1998 | Lott | |
| 5,970,143 A | 10/1999 | Schneier et al. | |
| 6,012,983 A | 1/2000 | Walker et al. | |
| 6,077,163 A * | 6/2000 | Walker et al. | 463/26 |
| 6,102,798 A | 8/2000 | Bennett | |
| 6,244,957 B1 | 6/2001 | Walker et al. | |
| 6,280,328 B1 | 8/2001 | Holch et al. | |
| 6,319,127 B1 | 11/2001 | Walker et al. | |
| 6,336,636 B1 * | 1/2002 | Smart | 273/447 |
| 6,346,043 B1 | 2/2002 | Colin et al. | |
| 6,602,133 B2 * | 8/2003 | Chan | 463/9 |
| 6,645,075 B1 | 11/2003 | Gatto et al. | |
| 6,761,632 B2 | 7/2004 | Bansemer et al. | |

(Continued)

FOREIGN PATENT DOCUMENTS

WO    WO 98/51384    11/1998

OTHER PUBLICATIONS

Examination Report from counterpart UK (GB) patent application (4 pages).
UK Patent Office Examination Report.

*Primary Examiner* — Jasson Yoo
(74) *Attorney, Agent, or Firm* — Neal, Gerber & Eisenberg LLP

(57) ABSTRACT

A gaming method may include receiving a value amount to initially define a value total, and causing video images to be generated, the video images representing a game including at least one value-generating event. The method also may include deducting a fee at intervals from the value total independent of play of the game represented by the video images, determining based on the fee a value payout associated with the at least one value-generating events, and adding the value payout to the value total. A gaming system or gaming apparatus may include a controller programmed to operate according to the gaming method. Further, a memory may have a computer program in accordance with the gaming method stored thereon.

17 Claims, 16 Drawing Sheets

(56) References Cited

U.S. PATENT DOCUMENTS

| | | |
|---|---|---|
| 6,780,103 B2 | 8/2004 | Bansemer et al. |
| 6,966,834 B1 | 11/2005 | Johnson |
| 7,056,210 B2 | 6/2006 | Bansemer et al. |
| 7,175,524 B2 | 2/2007 | Bansemer et al. |
| 2001/0041610 A1 | 11/2001 | Luciano et al. |
| 2002/0132660 A1* | 9/2002 | Taylor .............................. 463/16 |
| 2002/0147040 A1 | 10/2002 | Walker et al. |
| 2003/0069071 A1 | 4/2003 | Britt et al. |
| 2006/0025210 A1 | 2/2006 | Johnson |
| 2006/0205474 A1 | 9/2006 | Bansemer et al. |
| 2007/0129133 A1 | 6/2007 | Bansemer et al. |
| 2009/0061991 A1 | 3/2009 | Popovich et al. |
| 2009/0061997 A1 | 3/2009 | Popovich et al. |
| 2009/0061998 A1 | 3/2009 | Popovich et al. |
| 2009/0061999 A1 | 3/2009 | Popovich et al. |

* cited by examiner

FIG. 2
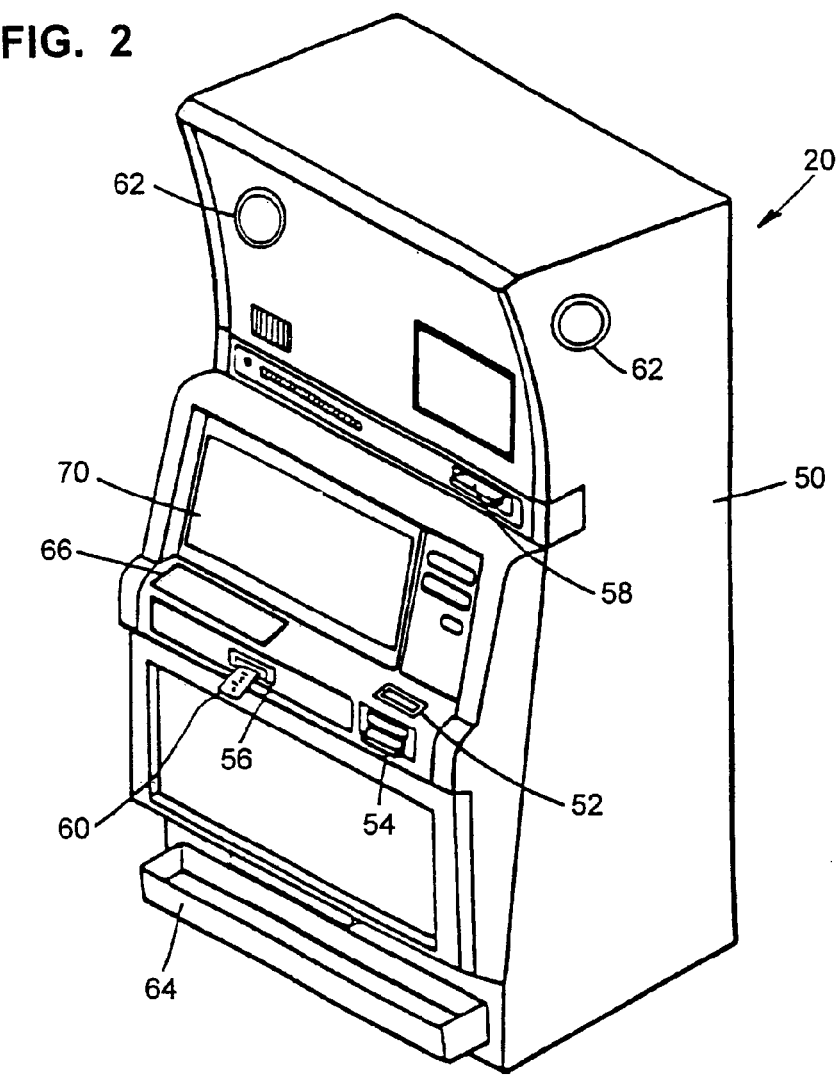
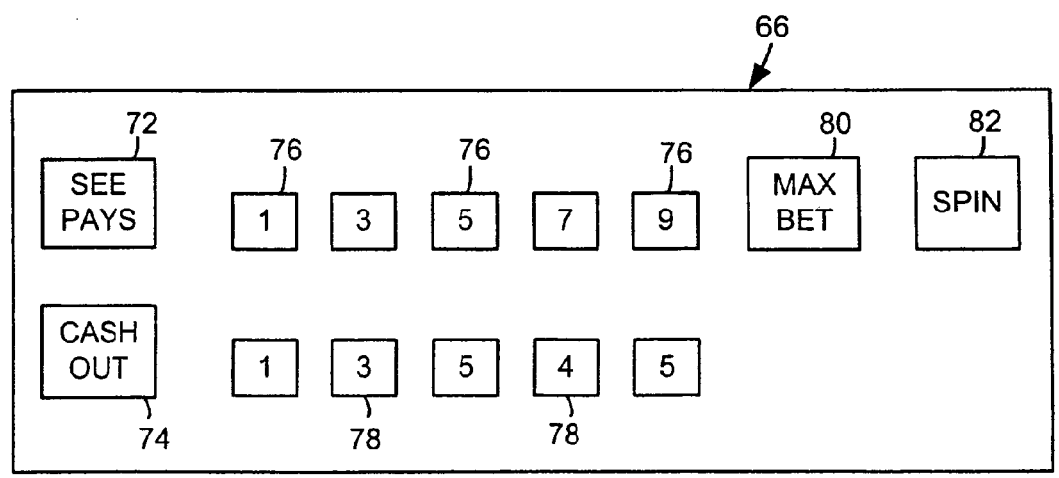
FIG. 2A

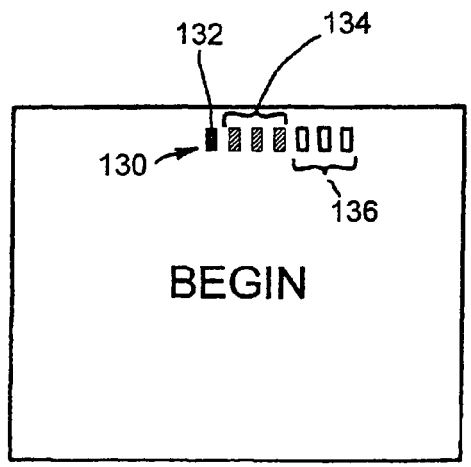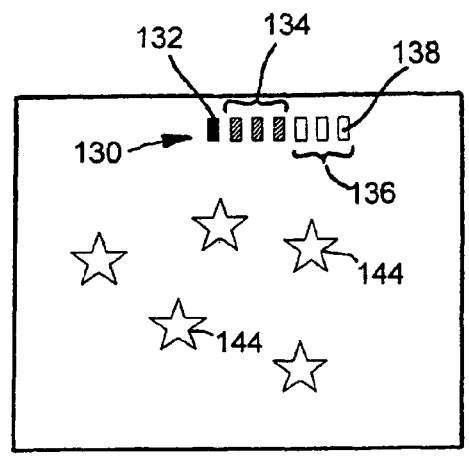
FIG. 5A  FIG. 5B
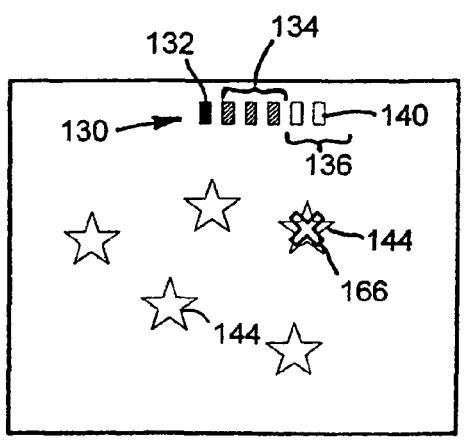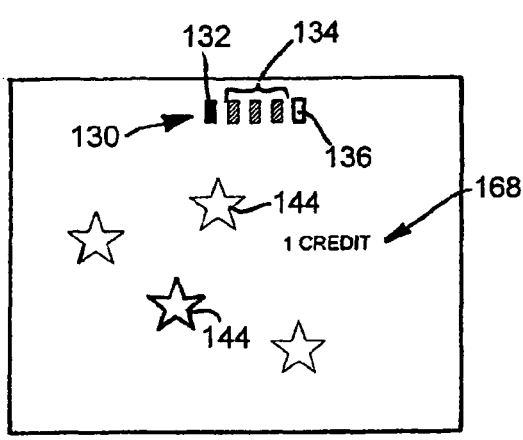
FIG. 5C  FIG. 5D
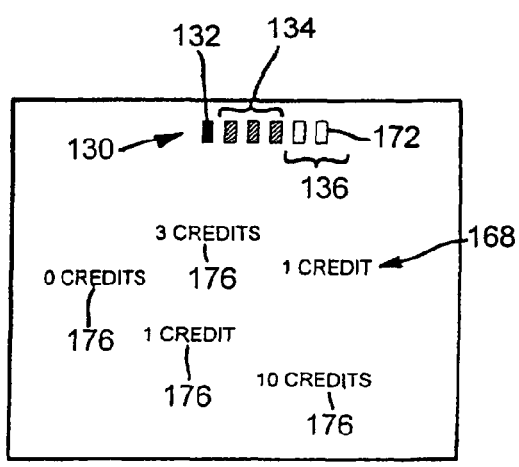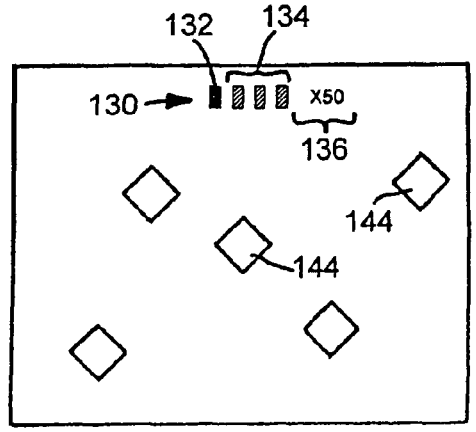
FIG. 5E  FIG. 5F

GAMING WITH FEE-TYPE WAGERING

PRIORITY CLAIM

This application is a divisional of, claims priority to and the benefit of U.S. patent application Ser. No. 10/056,550, filed on Jan. 25, 2002, the entire contents of which are incorporated by reference herein.

BACKGROUND

This patent relates to gaming, and, in particular, to gaming with fee-type wagering.

U.S. Reissue Pat. No. 35,864 discloses a gaming system using pari-mutuel wagering. According to the '864 patent, pari-mutuel wagering is a system by which all players compete for a common pool of funds to which each player contributes. The players also contribute to a pool that is distributed to the house for operating the gaming system. Players may contribute to the pool once, on a per wager basis, on a per game basis, on a per payout basis, or on an hourly basis. The '864 patent states that profits for the house are thus derived from a collection system rather than odds or player skill. The '864 patent further states that the player skills will be pitted against one another rather than against the house.

U.S. Pat. No. 5,823,879 discloses a gaming system with a wager accounting module. The player is required to place a wager for each hand of blackjack played. If the player does not accept a wager equal to a previous wager or place a new wager within a predetermined amount of time, then the wager accounting module automatically wagers either a wager equal to the previous wager or a minimum required bet.

BRIEF DESCRIPTION OF THE DRAWINGS

FIG. 2 is a perspective view of an embodiment of one of the gaming units shown schematically in FIG. 1;

FIG. 2A illustrates an embodiment of a control panel for a gaming unit;

FIGS. 5A-F are illustrations of an embodiment of a visual display that may be displayed during performance of the main routine of FIG. 4;

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. §112, sixth paragraph.

Figure 1:
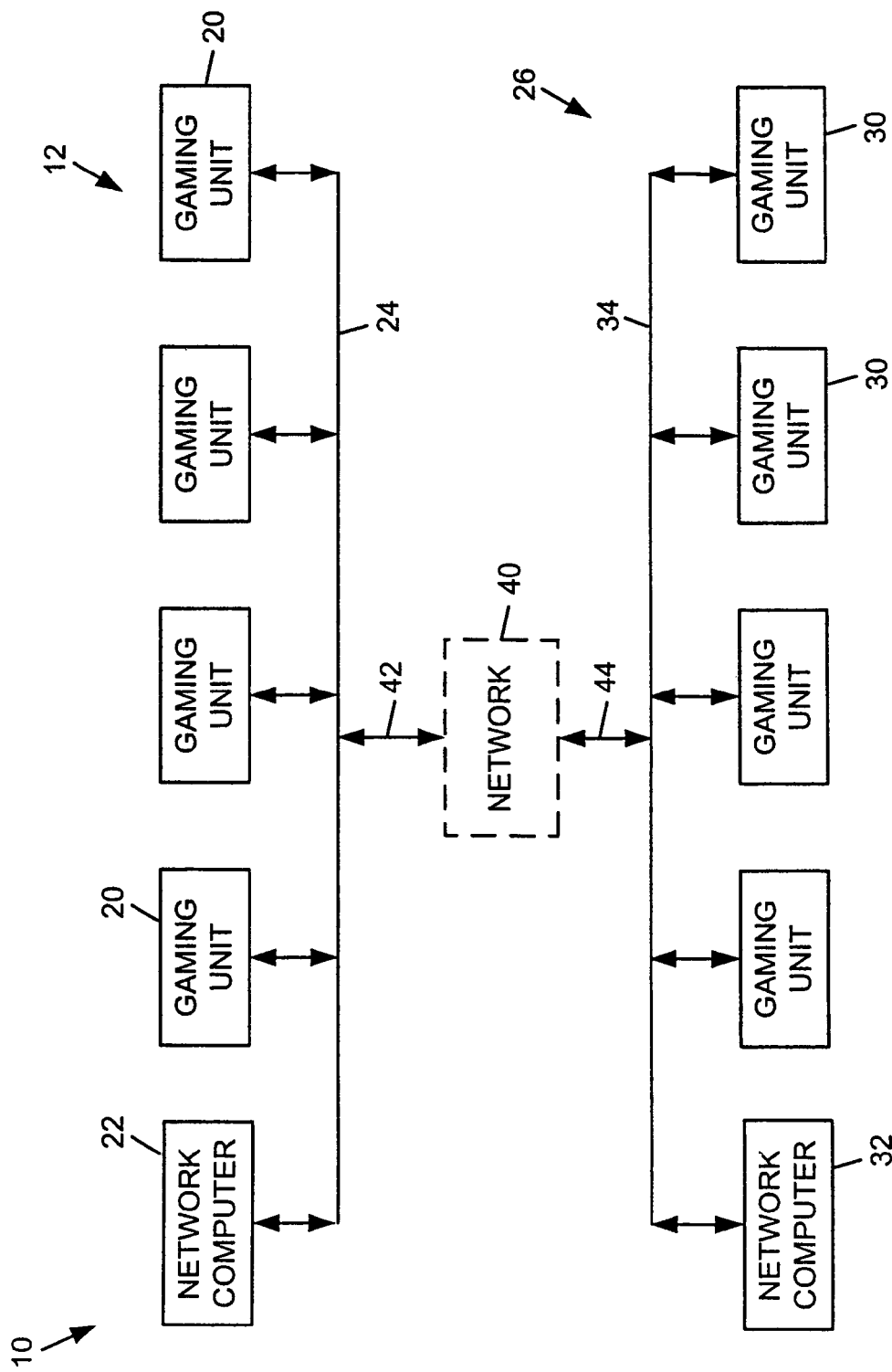
FIG. 1 is a block diagram of an embodiment of a gaming system in accordance with the invention.

FIG. 1 illustrates one possible embodiment of a casino gaming system 10 in accordance with the invention. Referring to FIG. 1, the casino gaming system 10 may include a first group or network 12 of casino gaming units 20 operatively coupled to a network computer 22 via a network data link or bus 24. The casino gaming system 10 may include a second group or network 26 of casino gaming units 30 operatively coupled to a network computer 32 via a network data link or bus 34. The first and second gaming networks 12, 26 may be operatively coupled to each other via a network 40, which may comprise, for example, the Internet, a wide area network (WAN), or a local area network (LAN) via a first network link 42 and a second network link 44.

The first network 12 of gaming units 20 may be provided in a first casino, and the second network 26 of gaming units 30 may be provided in a second casino located in a separate geographic location than the first casino. For example, the two casinos may be located in different areas of the same city, or they may be located in different states. The network 40 may include a plurality of network computers or server computers (not shown), each of which may be operatively interconnected. Where the network 40 comprises the Internet, data communication may take place over the communication links 42, 44 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four gaming units 20, 30, it should be understood that different numbers of computers and gaming units may be utilized. For example, the network 12 may include a plurality of network computers 22 and tens or hundreds of gaming units 20, all of which may be interconnected via the data link 24. The data link 24 may provided as a dedicated hardwired link or a wireless link. Although the data link 24 is shown as a single data link 24, the data link 24 may comprise multiple data links.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30. Each gaming unit 20 may be any type of casino gaming unit and may have various different structures and methods of operation. For exemplary purposes, various designs of the gaming units 20 are described below, but it should be understood that numerous other designs may be utilized.

Referring to FIG. 2, the casino gaming unit 20 may include a housing or cabinet 50 and one or more input devices, which may include a coin slot or acceptor 52, a paper currency acceptor 54, a ticket reader/printer 56 and a card reader 58, which may be used to input value to the gaming unit 20. A value input device may include any device that can accept value from a customer. As used herein, the term "value" may encompass gaming tokens, coins, paper currency, ticket vouchers, credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a casino game. The input control panel 66 may be provided with a plurality of pushbuttons or touch-sensitive areas that may be pressed by a player to select games, make wagers, make gaming decisions, etc.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, which may allow a player to select one, three, five, seven or nine paylines.

The control panel 66 may also be provided with a plurality of selection buttons 78 to permit a player to select a fee (value per unit time) to be assessed for playing the game, the fee being modifiable according to the number of paylines selected. For example, if the smallest fee is a quarter ($0.25) per minute, the gaming unit 20 may be provided with five selection buttons 78, which may allow a player to select a fee of one, two, three, four or five quarters. In that case, if a player were to activate the "5" button 76 (meaning that five paylines were to be played on the next spin of the reels) and then activate the "3" button 78 (meaning a three quarter fee), the total fee would be $3.75/minute.

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters/minute, or $11.25/minute. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

Gaming Unit Electronics

Figure 3:
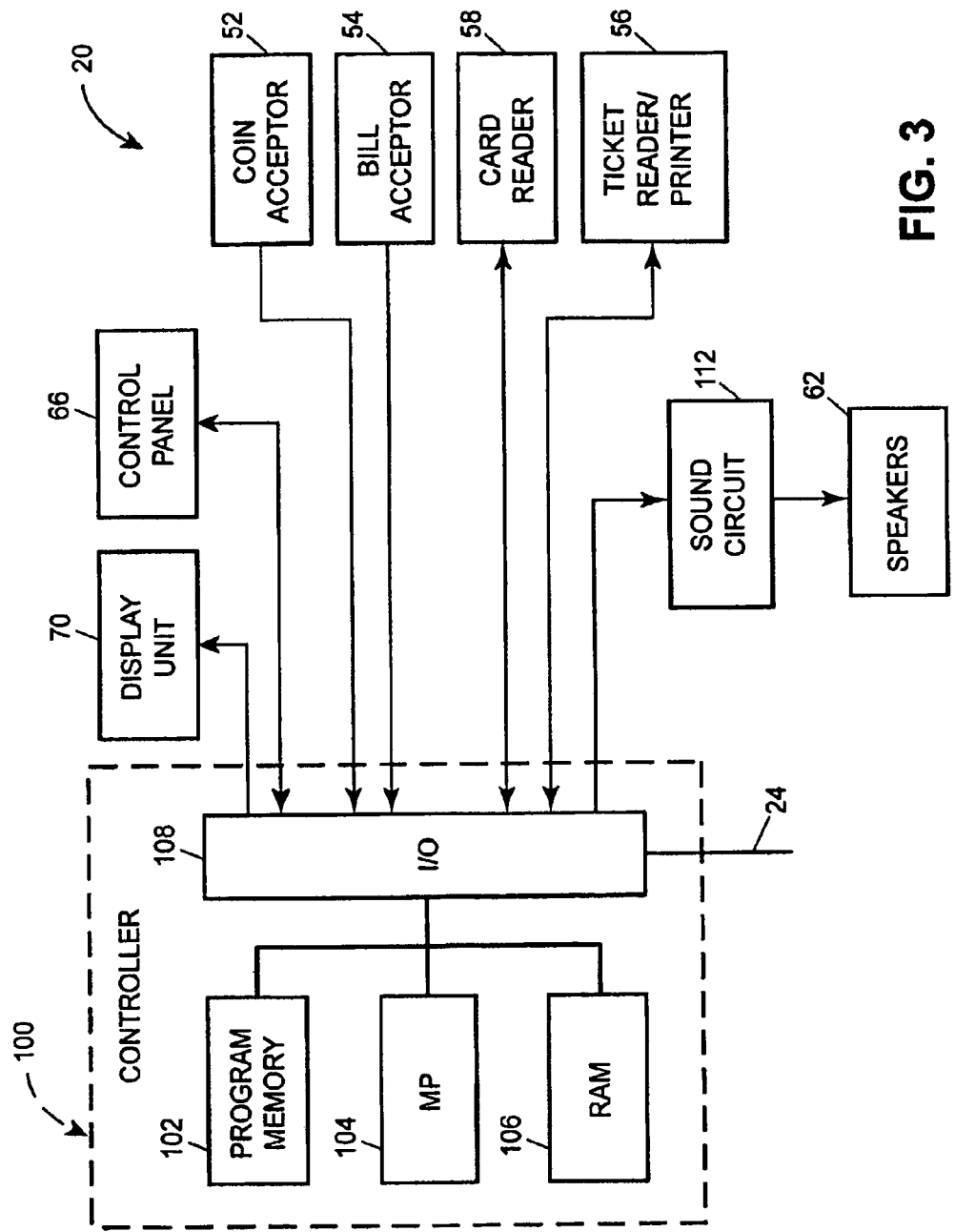
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the display unit 70, control panel 66, the coin acceptor 52, the bill acceptor 54, the card reader 58, and the ticket reader/printer 56 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Overall Operation of Gaming Unit

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location. Such remote control may be facilitated with the use of a wireless connection, or by an Internet interface that connects the gaming unit 20 with a remote computer (such as one of the network computers 22, 32) having a memory in which the computer program portions are stored. The computer program portions may be written in any high level language such as C, C+, C++, C# or the like or any low-level, assembly or machine language. By storing the computer program portions therein, various portions of the memories 102, 106 are physically and/or structurally configured in accordance with computer program instructions.

Figure 4A:
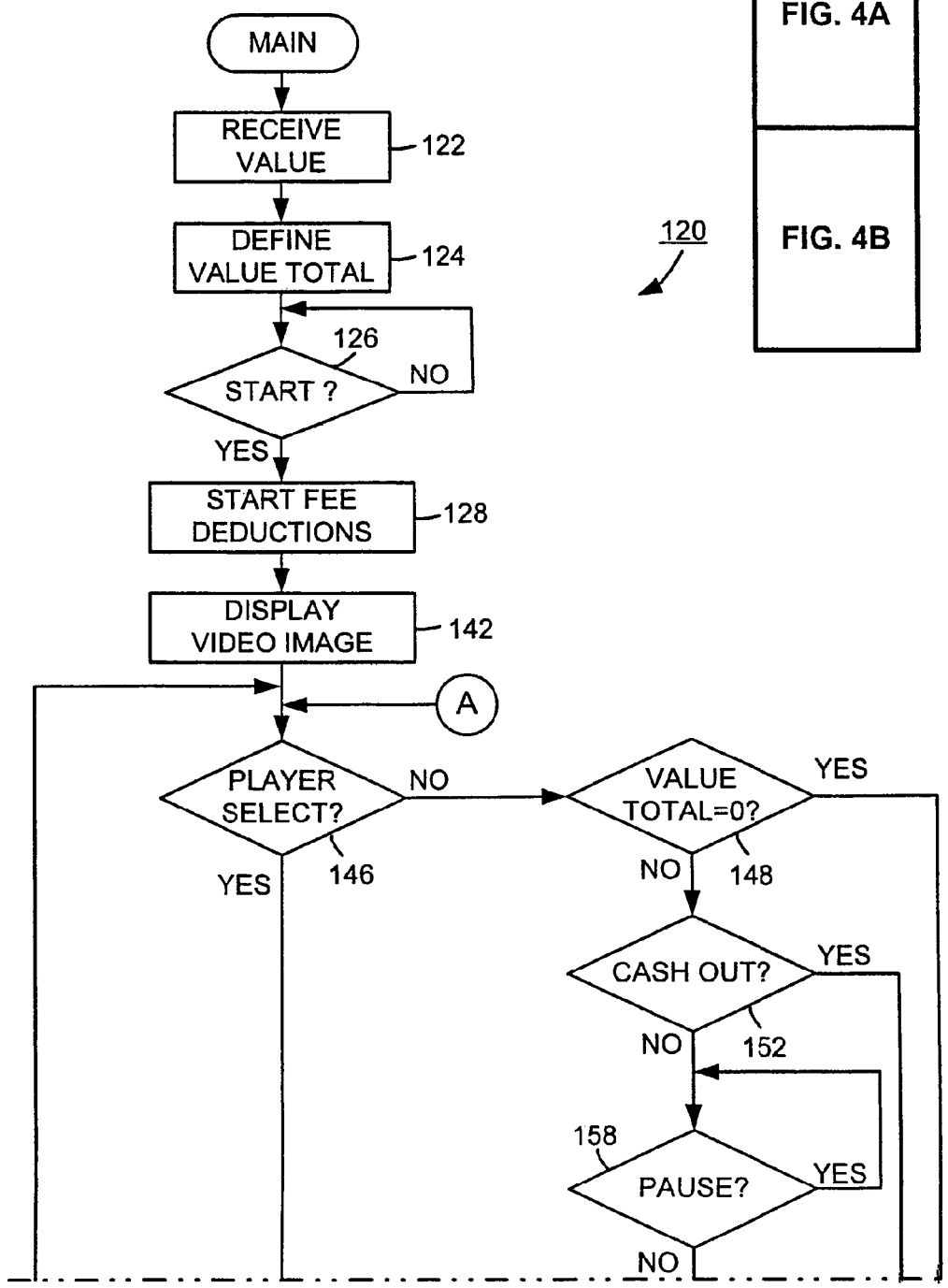
FIGS. 4A-B is a flowchart of an embodiment of a main routine that may be performed during operation of one or more gaming units.
Figure 4B:
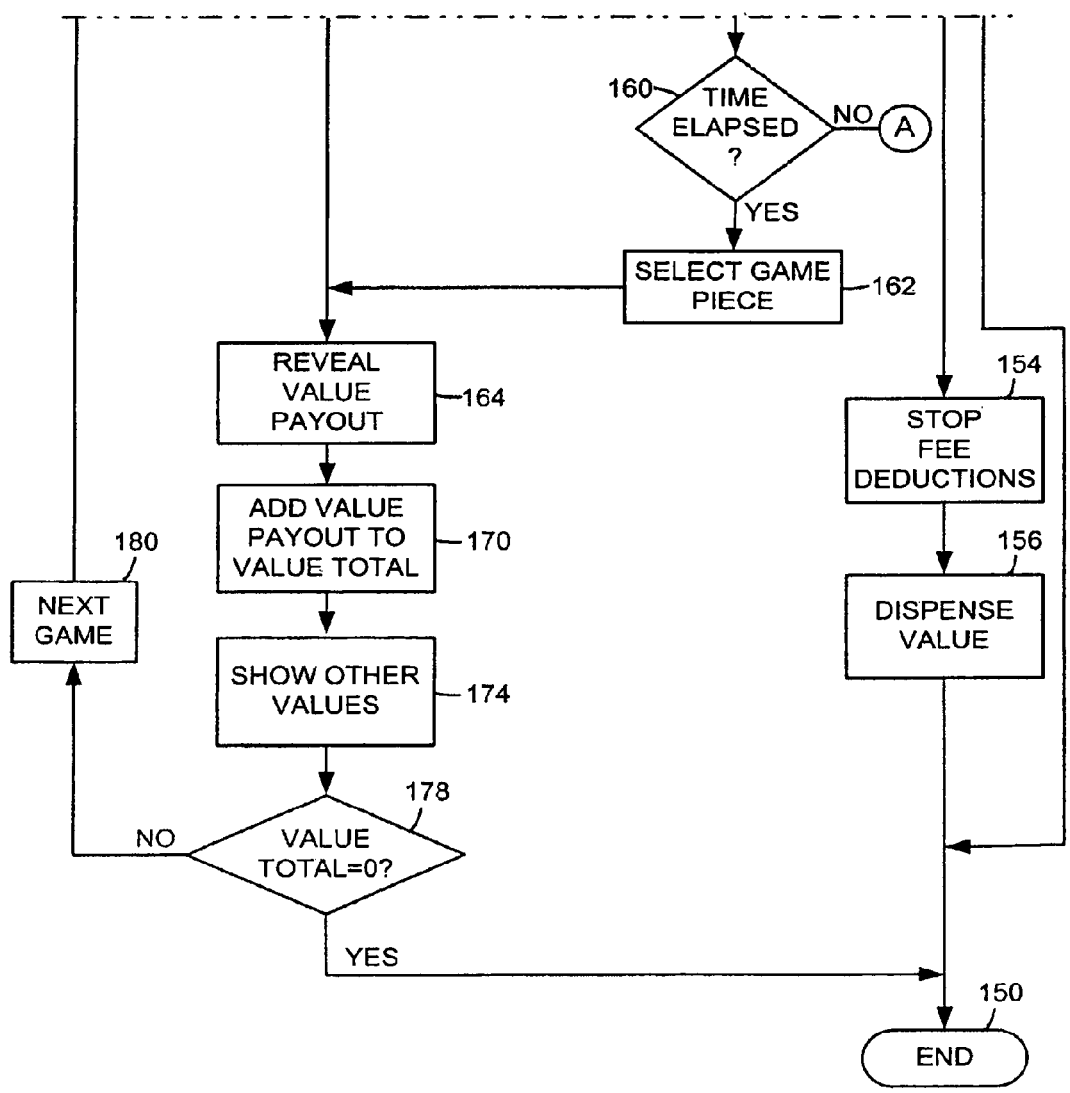

FIGS. 4A-B are a flowchart of a main operating routine 120 that may be stored in the memory of the controller 100. The main routine 120 may be utilized for gaming units 20, 30 that are designed to allow play of only a single game or single type of game, although the main routine 120 is not so limited, the illustration being by way of explanation instead. Exemplary video images generated during the play of the illustrated game are included as FIGS. 5A-F.

The routine may begin at a block 122 where a player may enter value into one of the gaming units 20, 30. The player may enter value by way of the coin acceptor 52, the paper currency acceptor 54, the ticket reader and/or the card reader 56, 58. The value may thus be in coin, paper or electronic form. The routine may then proceed to block 124 where the initial value amount entered is used to define a value total that will be used as a running total as explained in greater detail below.

The routine may proceed to block 126, where the gaming unit 20, 30 waits until the player signals his or her desire to begin the game. The gaming unit 20, 30 may alert the player to the fact that the gaming unit 20, 30 is waiting for the player to indicate his or her desire to begin the game through the use of video images, music, sound effects, etc. or any combination thereof. As illustrated in FIG. 5A, for example, the controller 100 of the gaming unit 20, generates a video image on the video display 70 of the word "BEGIN." This video image may be animated or enlarged, or become animated or start to grow over time. The video image may be accompanied by sound effects or music, or blinking or strobing lights. Other terms, like "START," may be used or substituted. The player may signal his or her desire to begin the game by depressing a "Begin Game" button, for example, at which time the attraction sequence may cease.

Alternatively, the routine may omit block 126, such that the game begins once the player has entered value into the gaming unit 20, 30.

At a block 128, the routine may deduct a fee from the value total. The fee may be based on time of play, rather than being assessed based on a game event, such as a hand, spin, card, ticket, etc. The fee deducted or assessed may thus be independent of the game being played, there being no one-to-one correspondence between fee and game event as there is between wager and game event in a typical casino game, such as poker, blackjack, slots, keno, bingo, and the like. It may be possible for the player to play one, more than one, or less than one hand, spin, card, ticket etc. per fee deduction depending upon the unit of time per fee and the length of time required by the player to complete the game event.

The amount of the fee may be fixed or variable. Moreover, the amount of the fee may be determined based on input from the player. Further, the timing of the fee deduction may be more or less continuous, periodic or at irregular time intervals.

As seen in FIGS. 5A-F, the value total may be represented visually on the display unit 70 as a series of bars 130 arranged like a gauge, although numerals may also be used, such as when the number of bars necessary to represent the value total would obscure the video images of the game (see FIG. 5F). The bars may be divided into three groups 132, 134, 136, arranged from left to right. Colors may be assigned to each of the three groups, with red being assigned to the group 132 furthest to the left as illustrated, yellow to the group 134, and green to the group 136.

The colors reinforce the information conveyed by the bars 130: the number of bars 130 decreases, as the game draws to an end. For example, each bar may represent a certain amount of value, such as a dollar. Moreover, the fee for playing the game may be at a rate of one dollar ($1.00) per minute. Consequently, as a dollar deduction is made after the first minute to the value total, a bar 138 is removed from the group of bars 130, as can be seen by comparing FIGS. 5B and 5C. Further, as a dollar deduction is made after the second minute to the value total, a bar 140 is removed from the group of bars 130, as can be seen by comparing FIGS. 5C and 5D.

After the deductions have been started, the controller 100 may control the display unit 70 at block 142 to display a video image of a game. The game illustrated in this embodiment includes one or more game piece images 144, as shown in FIG. 5B. As shown, the plurality of game piece images 144 are identical and are in the shape of stars. Alternatively, the game piece images 144 need not be identical and may have a shape other than stars. For example, as shown in FIG. 5F, the game piece images 144 may be some other geometric shape, such as diamonds. Moreover, the game piece images 144 may be animated so as to appear to be in motion about the video display.

The object of the game is for the player to select one of the plurality of game piece images 144. The player may use a button to select one of the game piece images 144. Additionally, the player may use a joystick or mouse to position a cursor over one of the game piece images 144 to select the game piece. Further, a touchscreen may be fitted over the display unit 70 so that the player may select one of the game piece images 144 by touching the touchscreen at a position corresponding to the one of the game piece images 144. The routine may make a determination whether the player has selected one of the game piece images 144 at block 146.

It may take some time for the player to select one of the game piece images 144, so initially the routine may determine that the player has not selected one of the game piece images 144 at block 146. Assuming that the player has not made a selection, the routine may proceed to block 148, where a determination may be made as to whether the value total is equal to zero. If the value total is equal to zero, the game is over. The routine may proceed from block 148 to end block 150.

On the other hand, the determination may be made at block 148 that the value total is not equal to zero, meaning that there is some accumulated value remaining. In this case, at block 152, a determination may be made as to whether the player wishes to have the accumulated value dispersed to him or her. The player may signal this, for example, by depressing a "Cash Out" button rather than selecting one of the game piece images 144. If it is determined that the player wishes to have the accumulated value dispersed, then the routine may proceed to block 154 where the controller 100 stops the deductions from the value total. The accumulated value may then be dispersed to the player at block 156, and the routine ends at block 150.

As a further alternative, it may be determined at block 152 that the player does not wish to have the accumulated value dispensed (i.e., the player has not depressed the "Cash Out" button). If this is the case, then a determination is made as to whether the player wishes to pause the game play at block 158. A pause may include a period of time, whether open-ended or of fixed duration, during which the deductions are not made from the value total. The player may also be prevented from selecting game pieces during this time. The player may signal his or her desire to pause the game play by depressing a dedicated "Pause" button, for example.

If the determination is made at block 158 that the player does not wish to pause the game, the routine may proceed to block 160 where a determination is made as to whether a time limit has elapsed since the previous game piece selection such that the controller 100 should make a selection for the player. Such a block may be included to prevent a player from failing to take any action because of performance anxiety over making a selection, and thereby losing all of the value entered through the fee deductions. In fact, some players may enjoy having the decision making process taken entirely out of their hands. The time limit used in the determination may be a fixed amount, or may vary according to statistical analysis of the player's selection pattern.

If the determination is made that the time limit has not elapsed, the routine may return to block 146. If the determination is made that the time limit has elapsed, then the routine may continue to block 162, and the controller 100 selects one of the game piece images 144 for the player. The controller 100 may select the game piece image 144 at random, or may follow a pattern that is preprogrammed or that is selected by the player at the start of the game.

Whether the game piece image 144 is selected by the player, as determined at block 146, or is selected by the controller 100, at block 162, the routine may proceed to block 164. At block 164, the game piece image 144 that has been selected (highlighted with an "X" 166 in FIG. 5C) is replaced with a message 168 to inform the player of a value award associated with the game piece image 144 selected. For example, the game piece selected in FIG. 5C has been replaced with the message "1 CREDIT" in FIG. 5D.

The credit value associated with the player's selection may be predetermined before the player selects one of the game piece images 144, or the value may be determined as the player selects. Where the value is predetermined, the values may be predetermined for each of the game pieces, such that the player has control over the value to be awarded based on his or her selection, or a single value may be predetermined and awarded to the player regardless of the selection the player makes. That is, where there is only one award that the player could receive for a specific game, but the presence of multiple game piece images 144 gives the player the impression that he or she is in control of the amount to be awarded.

The value payout may, at least in part, be based on the fees being deducted or assessed. That is, the gaming system operator of the gaming system 10 provides payouts to the players out of the fees collected. For the gaming system operator to make a profit, the value of fees collected will need to exceed the value of payouts made. Consequently, the payouts, and in particular the algorithms and odds/probabilities used to determine the payouts, are based on the fees deducted or assessed.

The value awarded may be added to the value total at block 170. The block 170 may be performed at approximately the same time as block 164, or may be performed slightly thereafter. Moreover, at approximately the same time or shortly thereafter, the bars 130 are updated to reflect the increase in value by adding a bar 172 to the group 136, as shown in FIG. 5E.

At block 174, the other game piece images 144 may be removed and messages substituted therefor. For example, as shown in FIG. 5E, other messages 176 such as "0 CREDITS," "3 CREDITS," and "10 CREDITS" may be displayed in place of the game pieces. The messages 176 may reflect actual value amounts that were associated with each of the game piece images 144. Alternatively, in the case where a single award value is available for each game regardless of the game piece selected, the messages do not actually represent a value amount associated with the game piece images 144 and may be randomly assigned.

A determination may be made at block 178 at to whether, given the outcome of the game, the value total is now equal to zero. If the value total is determined to be zero, then the routine may proceed to block 150 and end. If the value total is not equal to zero, then at a block 180 the video image may be reset (i.e., a new set of game piece images is displayed) and the controller may be prepared to make a new determination or set of determinations of the value amount(s) to be assigned to the game piece images 144. The routine then returns to the block 142.

As shown in FIG. 5F, when the video image is reset, game piece images 144 may have a different shape than those displayed in FIGS. 5B-D. Moreover, the number, color, size, animation, etc. of the game piece images 144 may differ from game to game.

Figure 6:
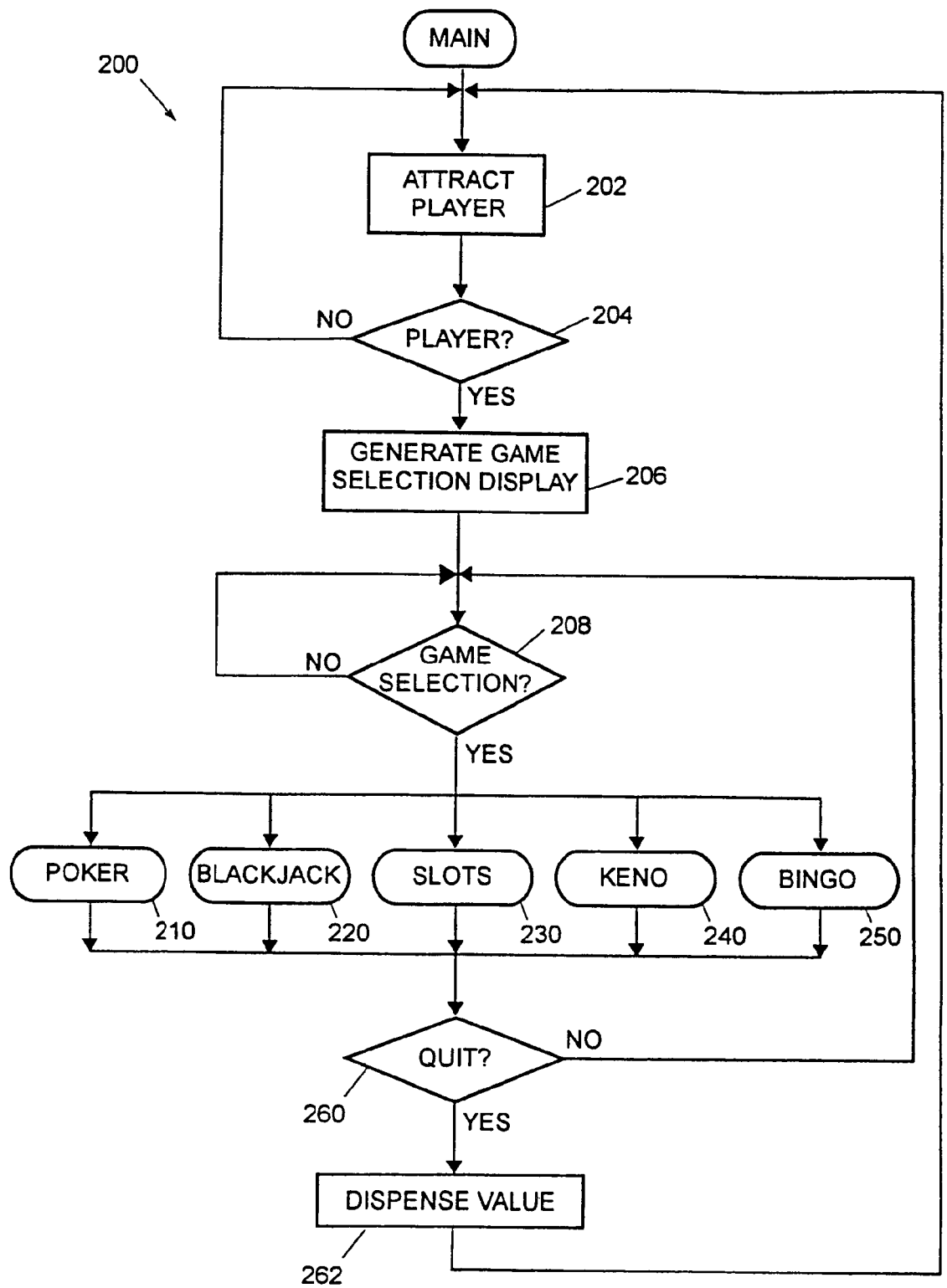
FIG. 6 is a flowchart of an alternate embodiment of a main routine that may be performed during operation of one or more of the gaming units.

FIG. 6 is a flowchart of an alternative main operating routine 200 that may be stored in the memory of the controller 100. Referring to FIG. 6, the main routine 200 may begin operation at block 202 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and a game-selection display may be generated on the display unit 70 at block 206 to allow the player to select a game available on the gaming unit 20. The gaming unit 20 may detect an input at block 204 in various ways. For example, the gaming unit 20 could detect if the player presses any button on the gaming unit 20.

The game-selection display generated at block 206 may include, for example, a list of fee-based wagering video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines including fee-based wagering to be performed to allow the selected game to be played. The game routines could include, for example, a video poker routine 210, a video blackjack routine 220, a slots routine 230, a video keno routine 240, and a video bingo routine 250. At block 208, if no game selection is made within a given period of time and/or if no value is entered, the operation may branch back to block 202.

After one of the routines 210, 220, 230, 240, 250 has been performed to allow the player to play one of the fee-based wagering games, block 260 may be utilized to determine whether the play should be terminated. For example, if the fees deducted exhausted the accumulated value total, play may be terminated. Alternatively, the player may wish to stop playing the gaming unit 20, or at least the game presently being played. The player may express his or her wish, for example, by selecting the "Cash Out" button. If play is to be stopped, either for lack of value or because the player wishes to quit, then the controller 100 may dispense the accumulated value, if any, to the player at block 262, and operation may then return to block 202.

If value remains and the player did not wish to quit, as determined at block 260, the routine may return to block 208 where the game-selection display may again be generated to allow the player to select another game.

It should be noted that although five gaming routines are shown in FIG. 6, a different number of routines could be included to allow play of a different number of games. The gaming unit 20 may also be programmed to allow play of different games.

Figure 7:
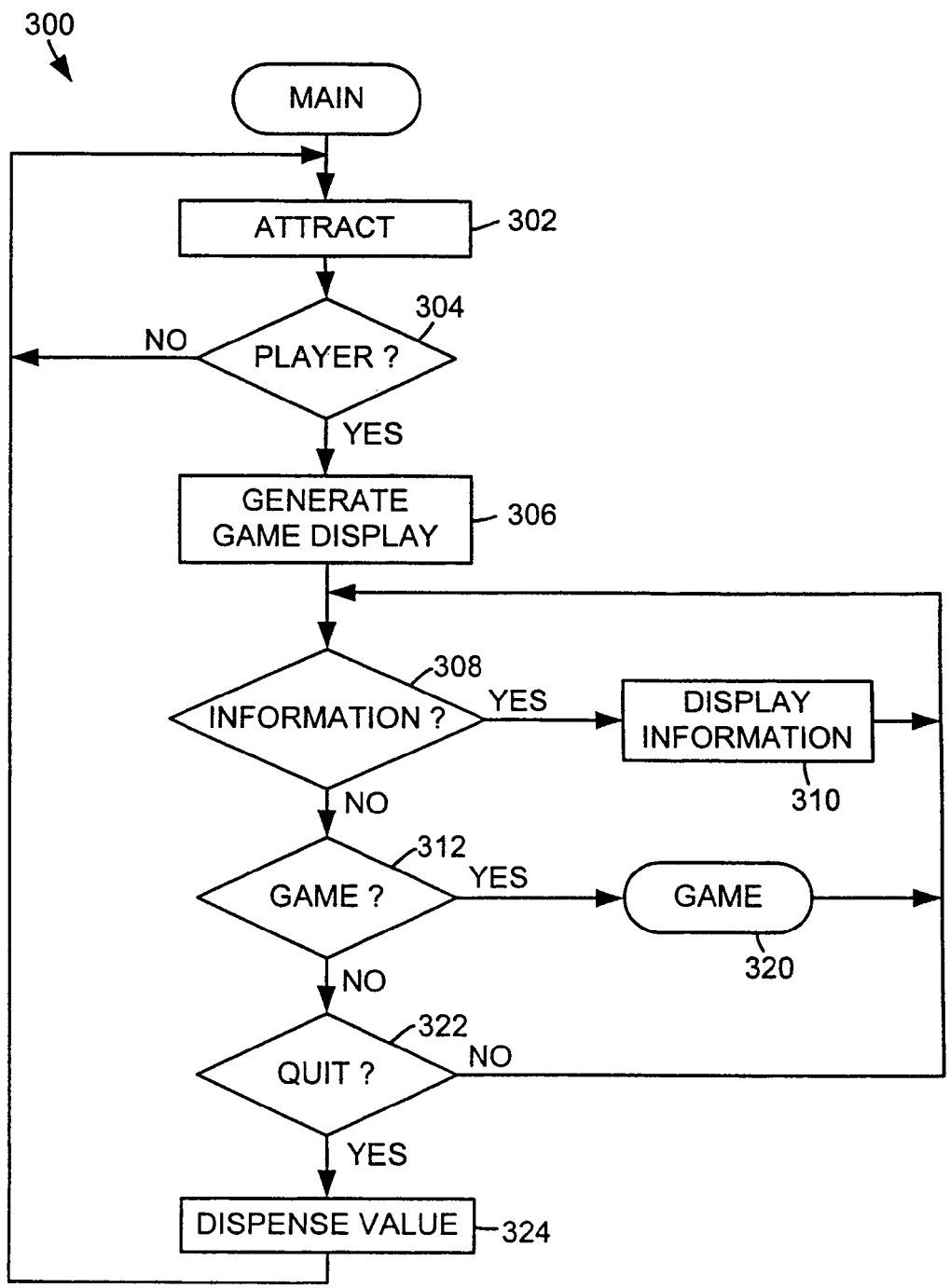
FIG. 7 is a flowchart of a further alternative embodiment of a main routine that may be performed during operation of one or more of the gaming units.

FIG. 7 is a flowchart of a further alternative main operating routine 300 that may be stored in the memory of the controller 100. The main routine 300 may be utilized for gaming units 20 that are designed to allow play of only a single game or single type of game. Referring to FIG. 7, the main routine 300 may begin operation at block 302 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 304, the attraction sequence may be terminated and a game display may be generated on the display unit 70 at block 306. The game display generated at block 306 may include, for example, an image of the fee-based wagering casino game that may be played on the gaming unit 20 and/or a visual message to prompt the player to deposit value into the gaming unit 20. At block 308, the gaming unit 20 may determine if the player requested information concerning the game, in which case the requested information may be displayed at block 310. Block 312 may be used to determine if the player requested initiation of a game, in which case a game routine 320 may be performed. The game routine 320 could be any one of the game routines disclosed herein, such as one of the five game routines 210, 220, 230, 240, 250, or another game routine.

After the routine 320 has been performed to allow the player to play the game, block 322 may be utilized to determine if the fees deducted have exhausted the accumulated value or if the player wishes to terminate play on the gaming unit 20. The player again may express his or her wish to stop playing the gaming unit 20, for example, by selecting the "Cash Out" button. If the accumulated value has not been exhausted through fees, the controller 100 may dispense the accumulated value to the player at block 324, and operation may then return to block 302. If the player did not wish to quit, as determined at block 322, the operation may return to block 308.

Video Poker

Figure 8:
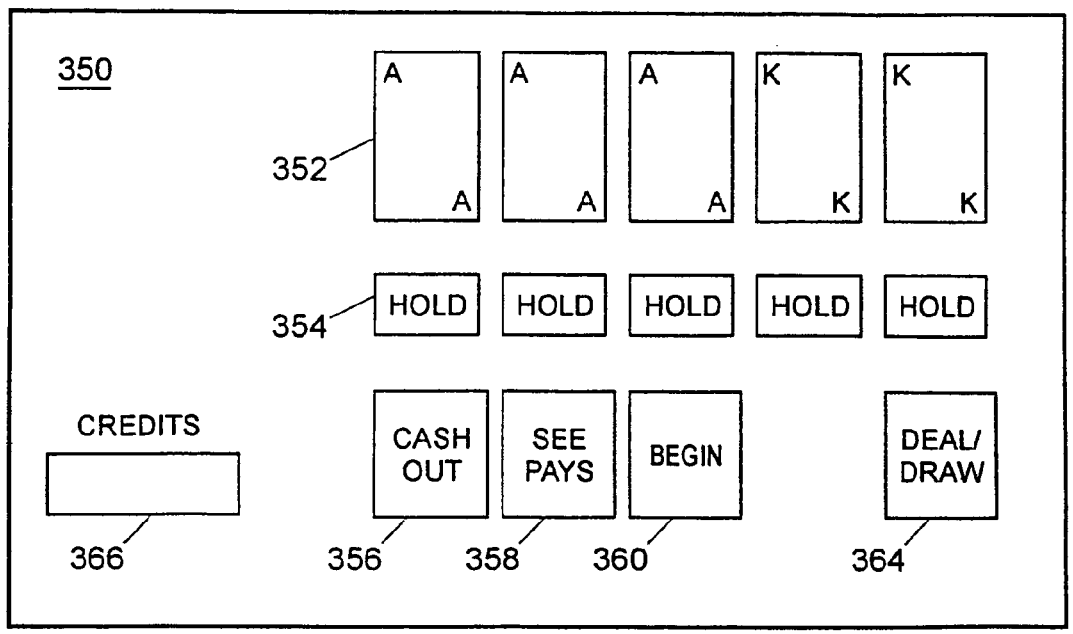
FIG. 8 is an illustration of an embodiment of a visual display that may be displayed during performance of the video poker routine of FIG. 10.

FIG. 8 is an exemplary display 350 that may be shown on the display unit 70 during performance of the fee-based wagering video poker routine 210 shown schematically in FIG. 6. Referring to FIG. 8, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Begin" button 360, and a "Deal/Draw" button 364. The display 350 may also include an area 366 in which the number of remaining credits or value is displayed. If the display unit 70 is provided with a touch-sensitive screen, the buttons 354, 356, 358, 360, 362 may form part of the video display 350. Alternatively, one or more of those buttons may be provided as part of a control panel that is provided separately from the display unit 70.

Figure 10:
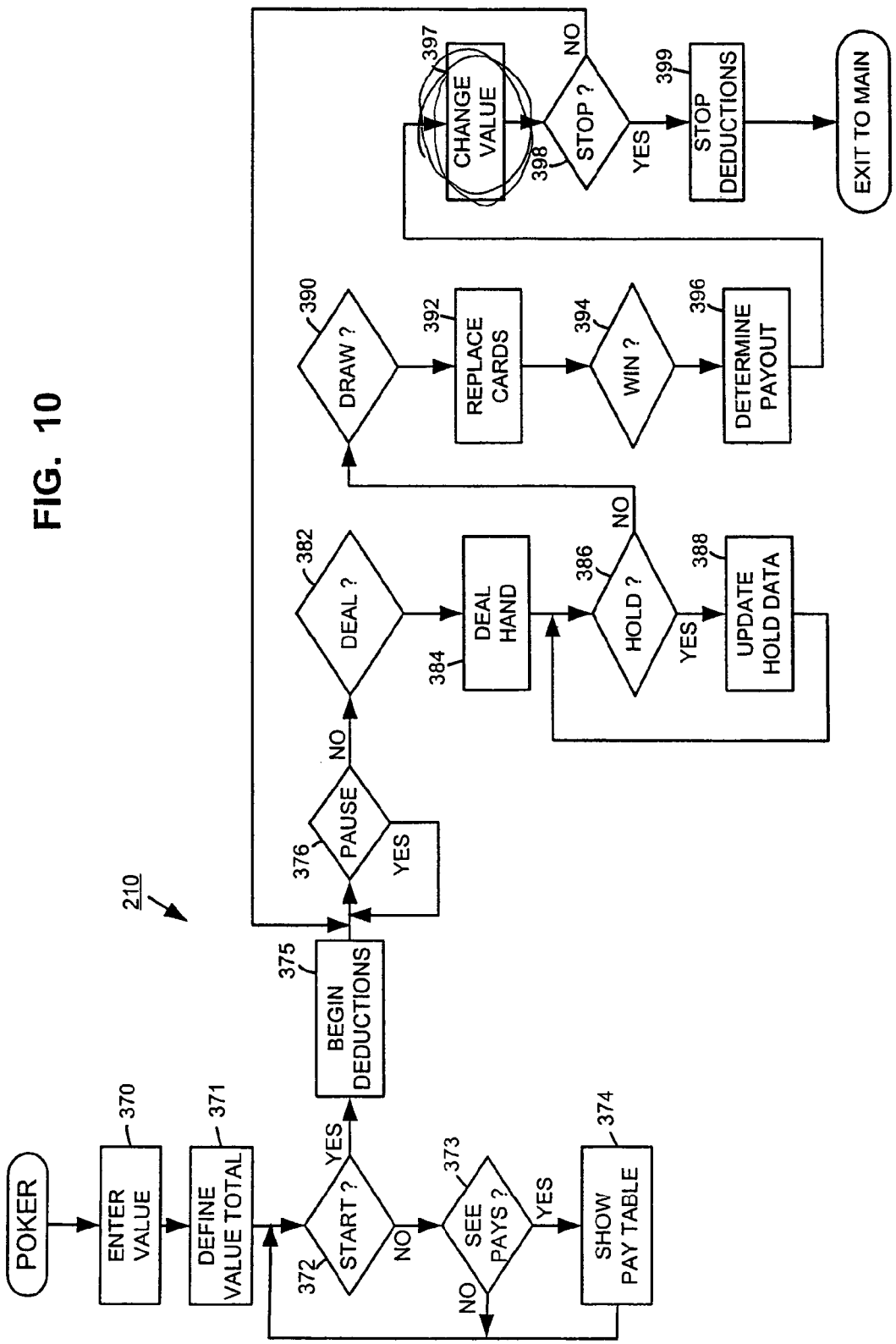
FIG. 10 is a flowchart of an embodiment of a video poker routine that may be performed by one or more of the gaming units.

FIG. 10 is a flowchart of the video poker routine 210 shown schematically in FIG. 6. Referring to FIG. 10, the routine may begin at a block 370 where a player may enter value into one of the gaming units 20, 30. The player may enter value by way of the coin acceptor 52, the paper currency acceptor 54, the ticket reader and/or the card reader 56, 58. The value may thus be in coin, paper or electronic form. The routine may then proceed to block 371 where the initial value amount entered is used to define a value total that will be used as a running total as explained in greater detail below.

The routine may proceed to block 372, where the gaming unit 20, 30 waits until the player signals his or her desire to begin the game. The gaming unit 20, 30 may alert the player to the fact that the gaming unit 20, 30 is waiting for the player to indicate his or her desire to begin the game through the use of video images, music, sound effects, etc. or any combination thereof. To start, the player may depress the "Begin" button 360, for example.

If the player has not expressed his or her wish to start at block 372, the routine may determine at block 373 whether the player has requested payout information, such as by activating the "See Pays" button 358, in which case at block 374 the routine may cause one or more pay tables to be displayed on the display unit 70. If the player has expressed his or her wish to start the game at block 372, then at block 375, the routine may begin deductions from the value total that may have been defined at block 371. To this extent, the comments regarding block 128 may be equally applicable here.

At any time between hands, the player may express his or her desire to pause the game at block 376. During the pause, the routine may not assess fee deductions from the value total. Additionally, while not shown in FIG. 10, the player may be permitted to access pay tables as in blocks 373, 374 during the pause. The player may express his or her wish to pause by, for example, depressing the "See Pays" button 358 and to resume play by depressing the "Begin" button 360.

At block 382, the routine may determine if the player desires a new hand to be dealt, which may be determined by detecting if the "Deal/Draw" button 364 was activated after the "Begin" button 360 is depressed. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 397, the player's cumulative value total may be increased, if the hand was a winner, by the payout value determined at block 396. The cumulative value or number of credits may also be displayed in the display area 366 (FIG. 8).

At a block 398, a determination is made whether play should be stopped. For example, play may be stopped if the value total becomes equal to zero, or if the player expresses his or her wish to stop play by depressing the "Cash Out" button 356. If the determination is made at block 398 that the play is not to be stopped, the operation returns to block 376. Otherwise, the routine may stop the deductions at a block 399, and may return to the main routine.

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 9:
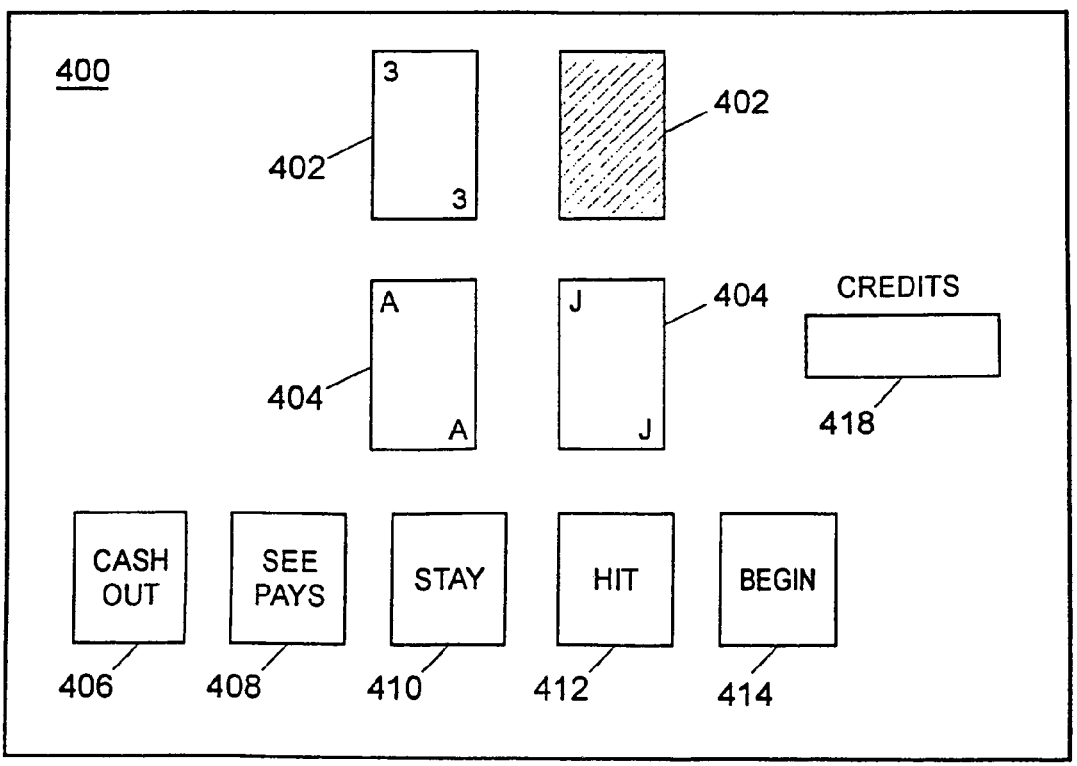
FIG. 9 is an illustration of an embodiment of a visual display that may be displayed during performance of the video blackjack routine of FIG. 11.

FIG. 9 is an exemplary display 400 that may be shown on the display unit 70 during performance of the video blackjack routine 220 shown schematically in FIG. 6. Referring to FIG. 9, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, and a "Begin" button 414. The display 400 may also include an area 418 in which the number of remaining credits or value is displayed. If the display unit 70 is provided with a touch-sensitive screen, the buttons 406, 408, 410, 412, 414 may form part of the video display 400. Alternatively, one or more of those buttons may be provided as part of a control panel that is provided separately from the display unit 70.

Figure 11:
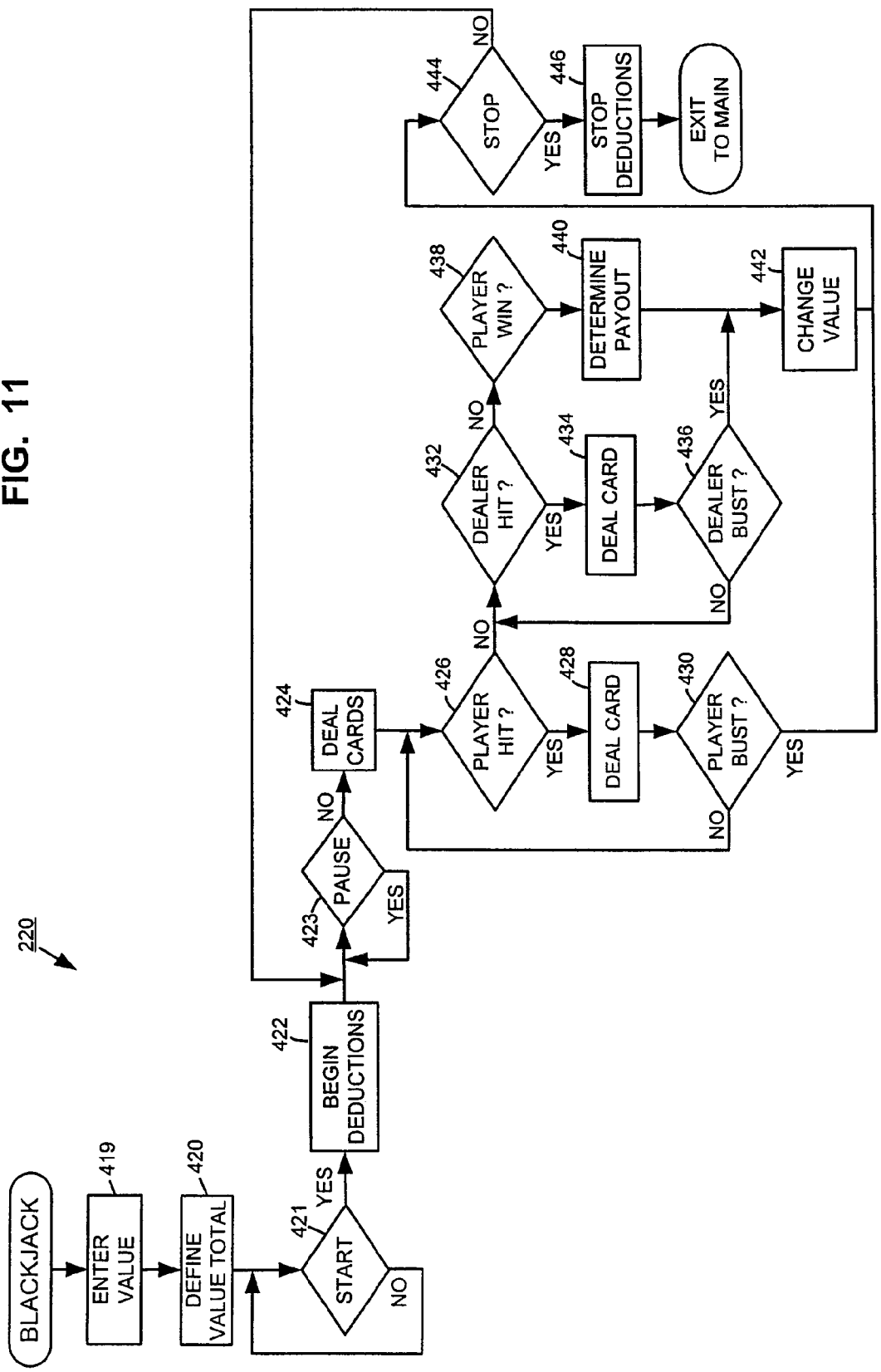
FIG. 11 is a flowchart of an embodiment of a video blackjack routine that may be performed by one or more of the gaming units.

FIG. 11 is a flowchart of the video blackjack routine 220 shown schematically in FIG. 6. Referring to FIG. 11, the routine may begin at a block 419 where a player may enter value into one of the gaming units 20, 30. The player may enter value by way of the coin acceptor 52, the paper currency acceptor 54, the ticket reader and/or the card reader 56, 58. The value may thus be in coin, paper or electronic form. The routine may then proceed to block 420 where the initial value amount entered is used to define a value total that will be used as a running total as explained in greater detail below.

The routine may proceed to block 421, where the gaming unit 20, 30 waits until the player signals his or her desire to begin the game. The gaming unit 20, 30 may alert the player to the fact that the gaming unit 20, 30 is waiting for the player to indicate his or her desire to begin the game through the use of video images, music, sound effects, etc. or any combination thereof. The player may depress the "Begin" button 360 to start.

If the player has expressed his or her wish to start the game at block 421, then at block 422, the routine may begin deductions from the value total that may have been defined at block 420. To this extent, the comments regarding block 128 may be equally applicable here. It will also be recognized that the player may express his or her desire to pause the game at block 423, during which the routine may not assess fee deductions from the value total.

At block 424, a dealer's hand and a player's hand may be "dealt" by making the playing card images 402, 404 appear on the display unit 70. At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by adding, if the player won, the payout value determined at block 440. The cumulative value or number of credits may also be displayed in the display area 418 (FIG. 9).

At a block 444, a determination is made whether play should be stopped. For example, play may be stopped if the value total becomes equal to zero, or if the player expresses his or her wish to stop play by depressing the "Cash Out" button 406. If the determination is made at block 444 that the play is not to be stopped, the operation returns to block 423. Otherwise, the routine may stop the deductions at a block 446, and may return to the main routine.

Slots

Figure 12:
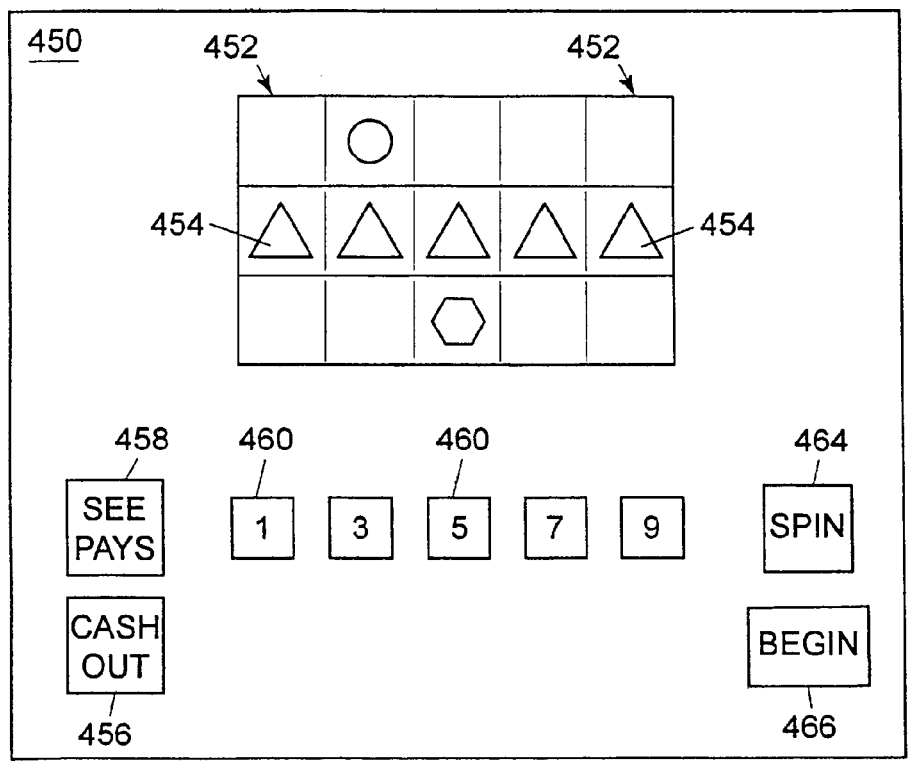
FIG. 12 is an illustration of an embodiment of a visual display that may be displayed during performance of the slots routine of FIG. 14.

FIG. 12 is an exemplary display 450 that may be shown on the display unit 70 during performance of the slots routine 230 shown schematically in FIG. 6. Referring to FIG. 12, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a "Spin" button 464, and a "Begin" button 466 to allow a player to make the maximum wager allowable.

Figure 14:
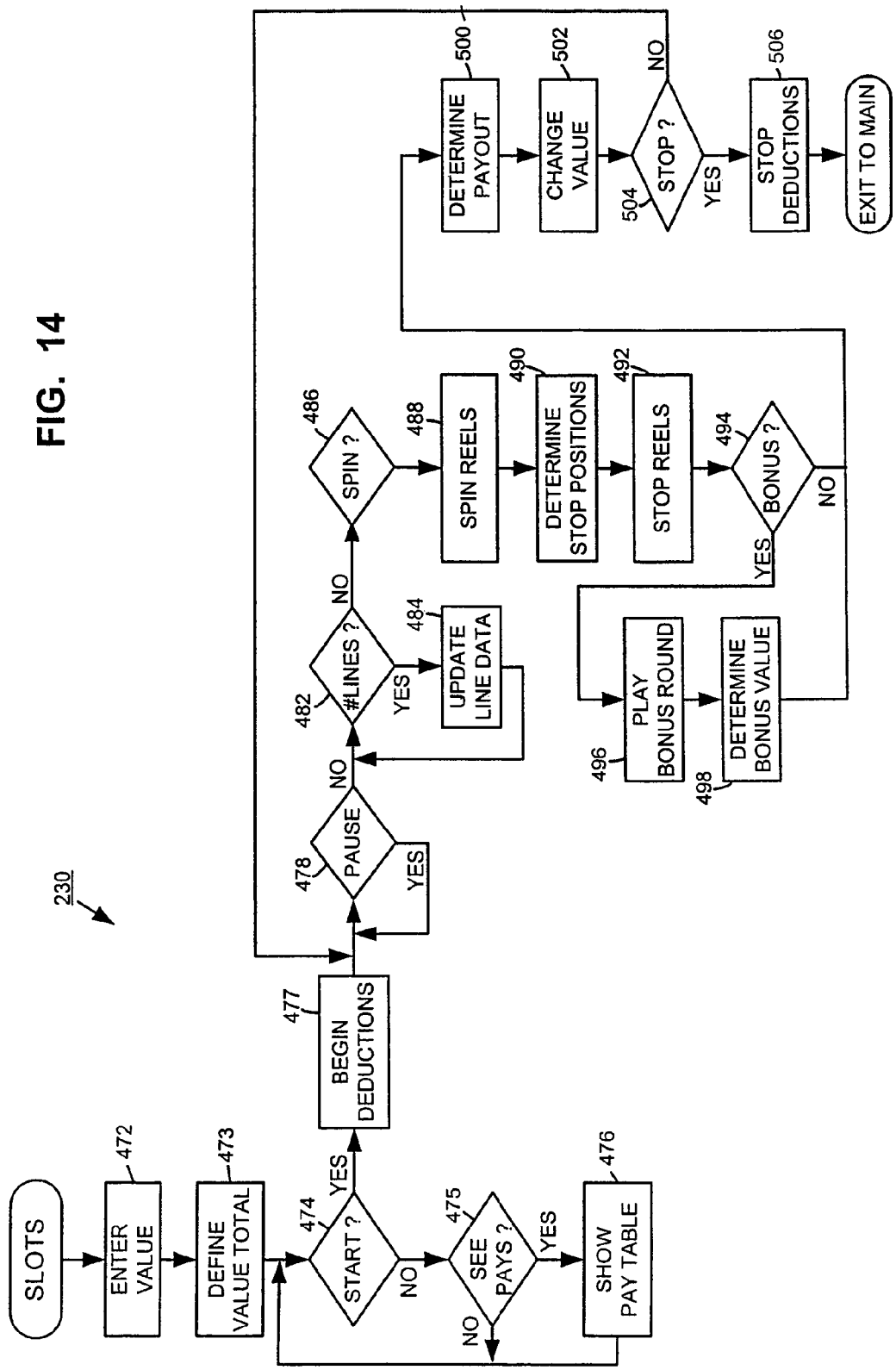
FIG. 14 is a flowchart of an embodiment of a slots routine that may be performed by one or more of the gaming units.

FIG. 14 is a flowchart of the slots routine 230 shown schematically in FIG. 6. Referring to FIG. 14, the routine may begin at a block 472 where a player may enter value into one of the gaming units 20, 30. The player may enter value by way of the coin acceptor 52, the paper currency acceptor 54, the ticket reader and/or the card reader 56, 58. The value may thus be in coin, paper or electronic form. The routine may then proceed to block 473 where the initial value amount entered is used to define a value total that will be used as a running total as explained in greater detail below.

The routine may proceed to block 474, where the gaming unit 20, 30 waits until the player signals his or her desire to begin the game. The gaming unit 20, 30 may alert the player to the fact that the gaming unit 20, 30 is waiting for the player to indicate his or her desire to begin the game through the use of video images, music, sound effects, etc. or any combination thereof. The player may depress the "Begin" button 466 to start.

If the player has not expressed his or her wish to start at block 474, the routine may determine at block 475 whether the player has requested payout information, such as by activating the "See Pays" button 458, in which case at block 476 the routine may cause one or more pay tables to be displayed on the display unit 70. If the player has expressed his or her wish to start the game at block 474, then at block 477, the routine may begin deductions from the value total that may have been defined at block 473. To this extent, the comments regarding block 128 may be equally applicable here.

The player may express his or her desire to pause the game at block 478. During the pause, the routine may not assess fee deductions from the value total. Additionally, while not shown in FIG. 14, the player may be permitted to access pay tables as in blocks 475, 476 during the pause. The player may express his or her wish to pause by, for example, depressing the "See Pays" button 458, and to resume play by depressing the "Begin" button 466.

At block 482, the routine may determine whether the player has pressed one of the payline-selection buttons 460, in which case at block 484 data corresponding to the number of paylines selected by the player may be stored in the memory of the controller 100. The payline data may be used to adjust the fee deduction above and the payout determination below. That is, a base fee may be deducted if a single payline is selected, that base fee may be multiplied by the number of paylines selected at block 482. Also, if a base payout may be awarded if a single payline is selected, then the base payout may be multiplied by the number of paylines selected.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by adding, if the slot game and/or bonus round was a winner, the payout value determined at block 500.

At a block 504, a determination is made whether play should be stopped. For example, play may be stopped if the value total becomes equal to zero, or if the player expresses his or her wish to stop play by depressing the "Cash Out" button 456. If the determination is made at block 504 that the play is not to be stopped, the operation returns to block 478. Otherwise, the routine may stop the deductions at a block 506, and may return to the main routine.

Although the above routine has been described as a virtual slot machine routine in which slot machine reels are represented as images on the display unit 70, actual slot machine reels that are capable of being spun may be utilized instead.

Video Keno

Figure 13:
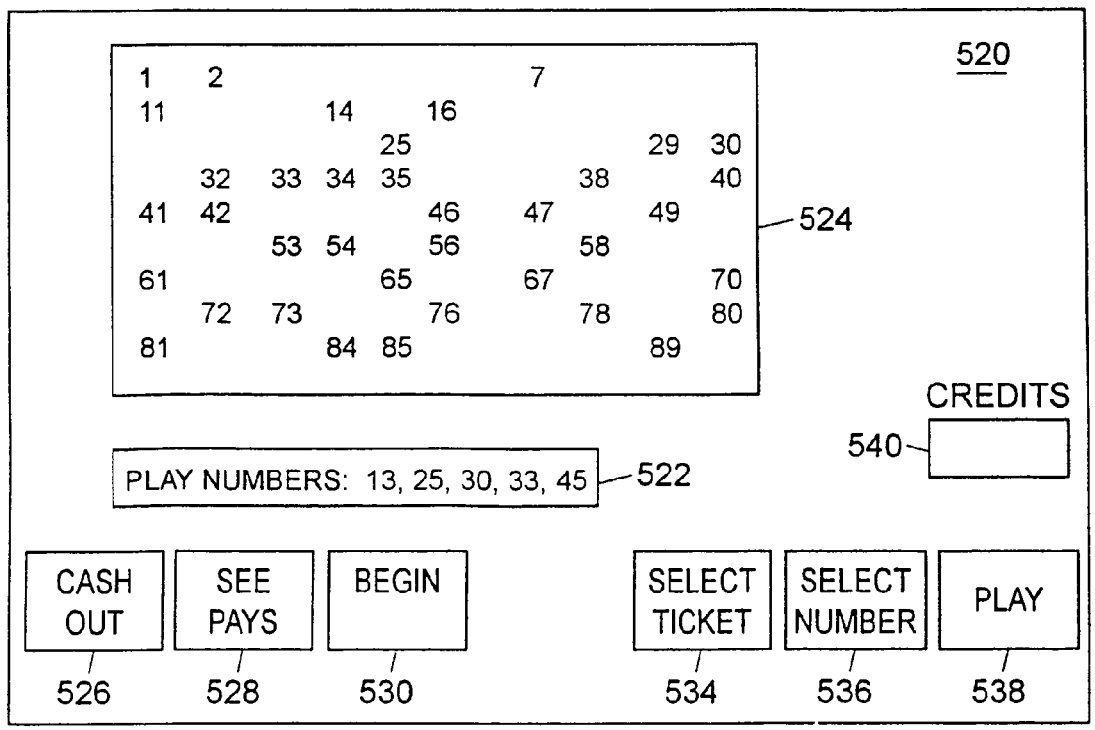
FIG. 13 is an illustration of an embodiment of a visual display that may be displayed during performance of the video keno routine of FIG. 15.

FIG. 13 is an exemplary display 520 that may be shown on the display unit 70 during performance of the video keno routine 240 shown schematically in FIG. 6. Referring to FIG. 13, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Begin" button 530, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 15:
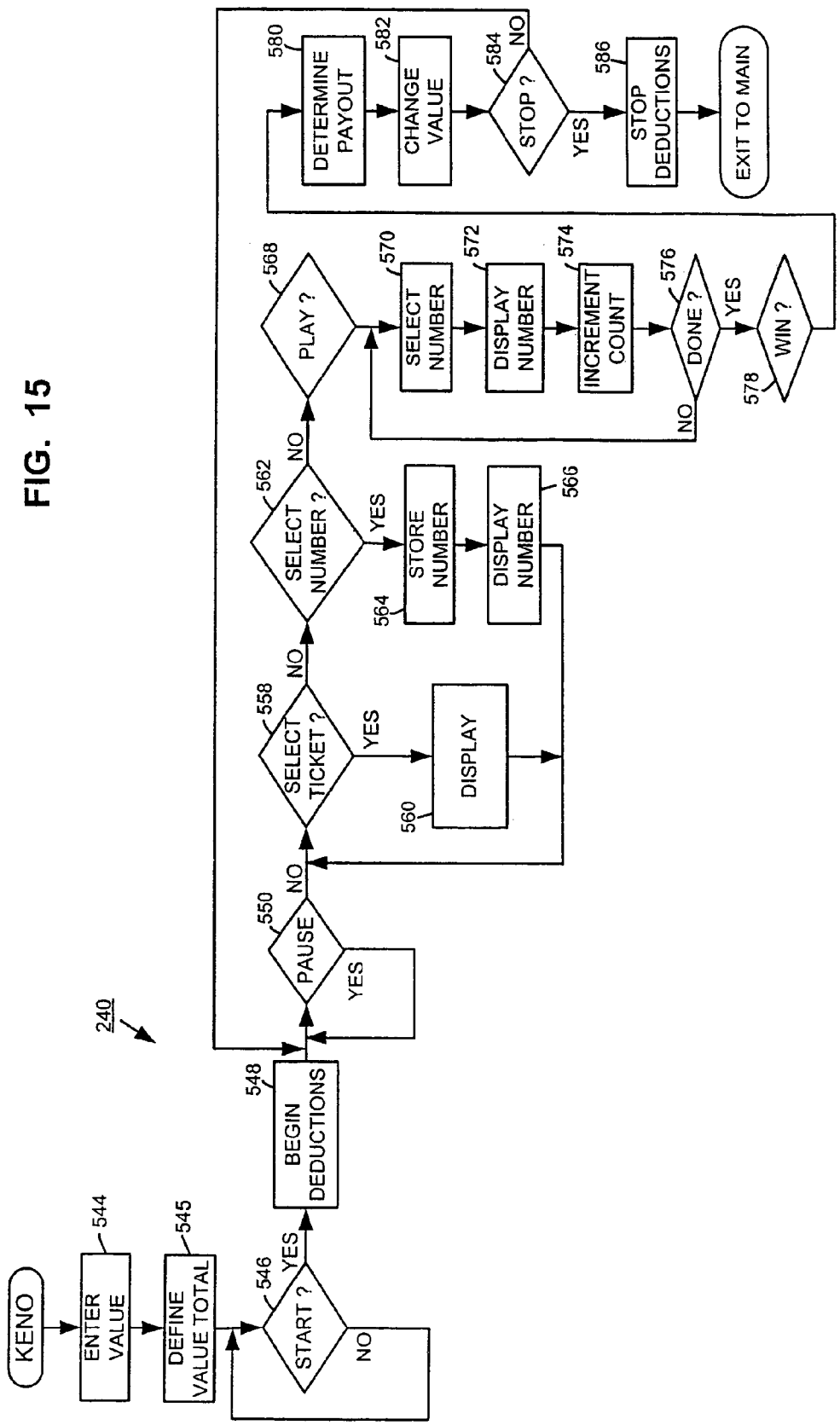
FIG. 15 is a flowchart of an embodiment of a video keno routine that may be performed by one or more of the gaming units.

FIG. 15 is a flowchart of the video keno routine 240 shown schematically in FIG. 6. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 15, the routine may begin at a block 544 where a player may enter value into one of the gaming units 20, 30. The player may enter value by way of the coin acceptor 52, the paper currency acceptor 54, the ticket reader and/or the card reader 56, 58. The value may thus be in coin, paper or electronic form. The routine may then proceed to block 545 where the initial value amount entered is used to define a value total that will be used as a running total as explained in greater detail below.

The routine may proceed to block 546, where the gaming unit 20, 30 waits until the player signals his or her desire to begin the game. The gaming unit 20, 30 may alert the player to the fact that the gaming unit 20, 30 is waiting for the player to indicate his or her desire to begin the game through the use of video images, music, sound effects, etc. or any combination thereof. The player may depress the "Begin" button 530 to start.

If the player has expressed his or her wish to start the game at block 546, then at block 548, the routine may begin deductions from the value total that may have been defined at block 545. To this extent, the comments regarding block 128 may be equally applicable here.

The player may express his or her desire to pause the game at block 550. During the pause, the routine may not assess fee deductions from the value total. The player may express his or her wish to pause by, for example, depressing the "See Pays" button 528 and to resume play by depressing the "Begin" button 530.

At block 558, the player may select a keno ticket, and at block 560 the ticket may be displayed on the display 520. At block 562, the player may select one or more game numbers, which may be within a range set by the casino. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the casino may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by adding, if the keno game was won, the payout value determined at block 580. The cumulative value or number of credits may also be displayed in the display area 540 (FIG. 13).

At a block 584, a determination is made whether play should be stopped. For example, play may be stopped if the value total becomes equal to zero, or if the player expresses his or her wish to stop play by depressing the "Cash Out" button 526. If the determination is made at block 584 that the play is not to be stopped, the operation returns to block 550. Otherwise, the routine may stop the deductions at a block 586, and may return to the main routine.

Video Bingo

Figure 16:
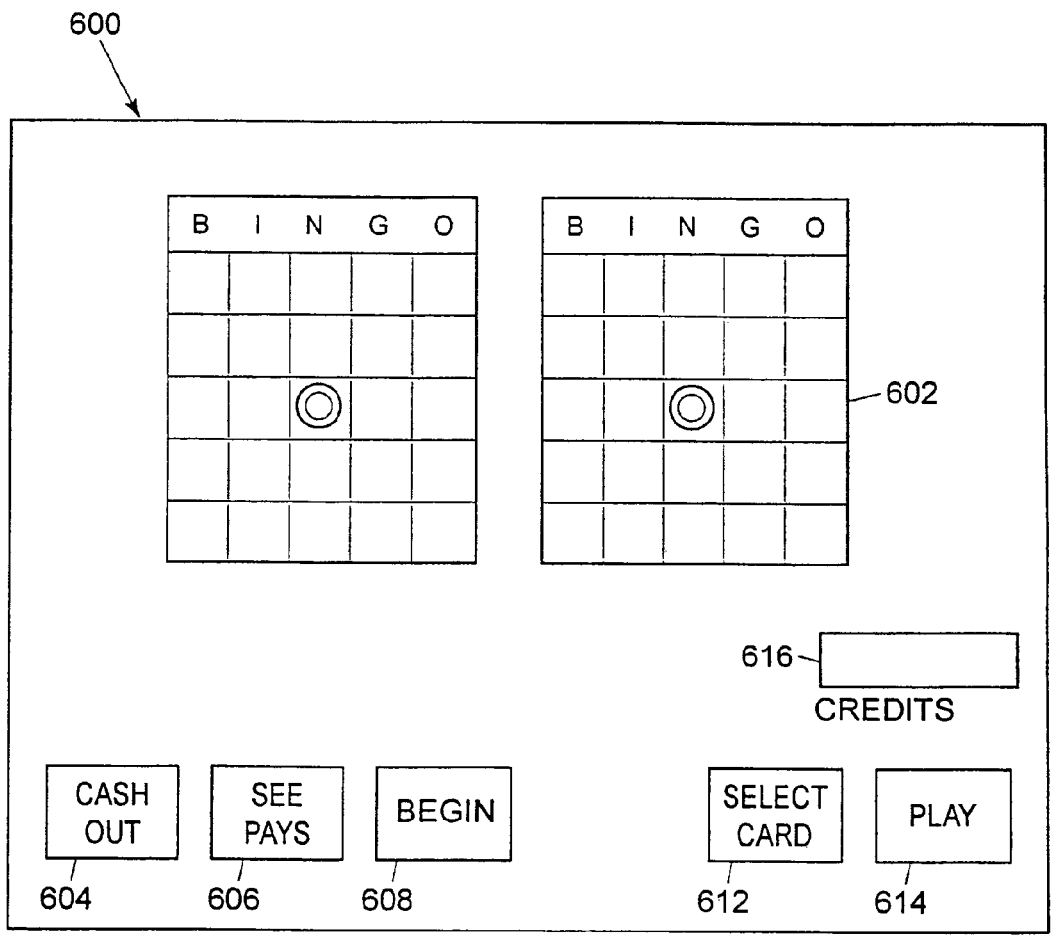
FIG. 16 is an illustration of an embodiment of a visual display that may be displayed during performance of the video bingo routine of FIG. 17.

FIG. 16 is an exemplary display 600 that may be shown on the display unit 70 during performance of the video bingo routine 250 shown schematically in FIG. 6. Referring to FIG. 16, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Begin" button 608, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 17:
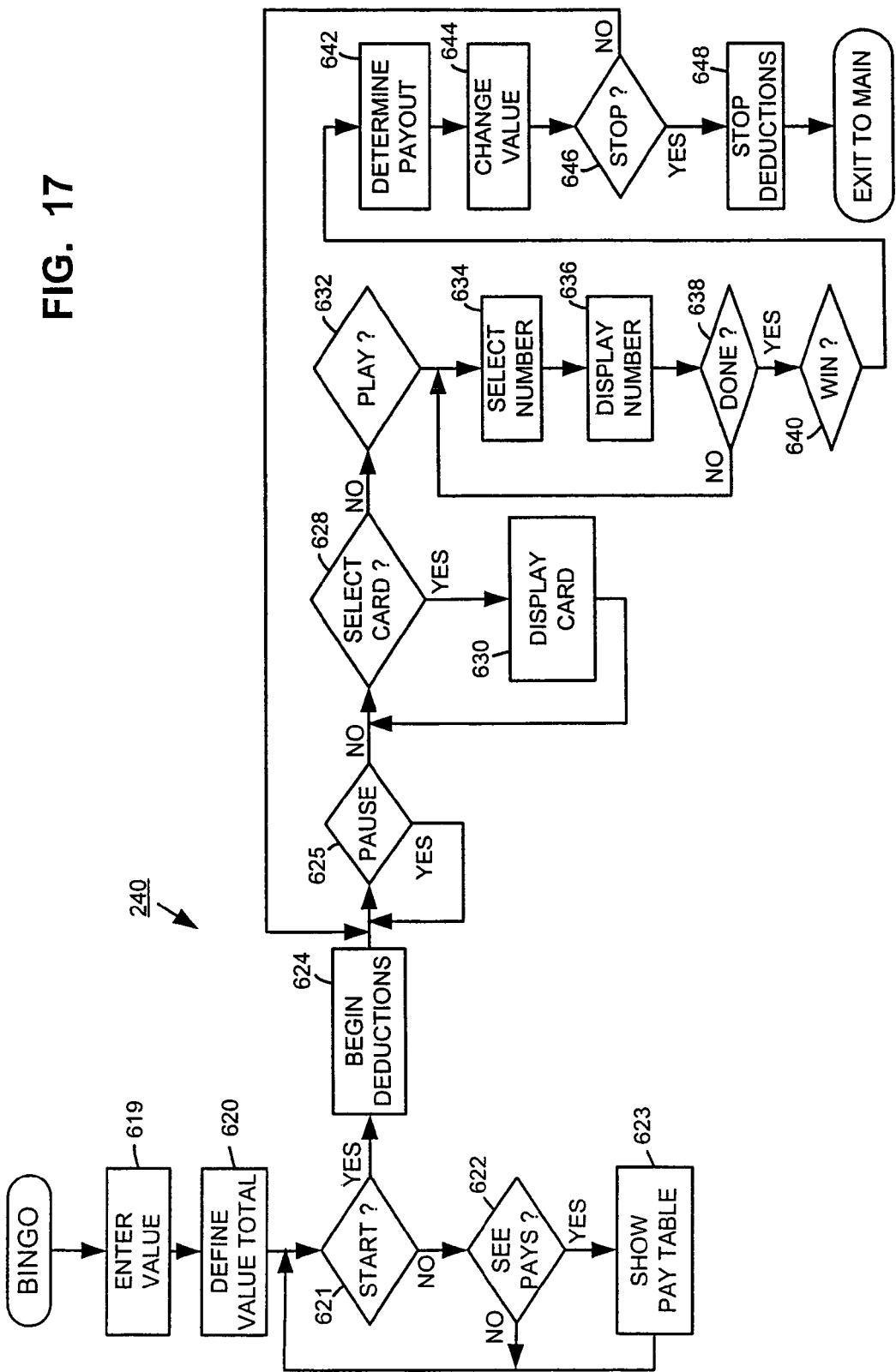
FIG. 17 is a flowchart of an embodiment of a video bingo routine that may be performed by one or more of the gaming units.

FIG. 17 is a flowchart of the video bingo routine 250 shown schematically in FIG. 6. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 17, the routine may begin at a block 619 where a player may enter value into one of the gaming units 20, 30. The player may enter value by way of the coin acceptor 52, the paper currency acceptor 54, the ticket reader and/or the card reader 56, 58. The value may thus be in coin, paper or electronic form. The routine may then proceed to block 620 where the initial value amount entered is used to define a value total that will be used as a running total as explained in greater detail below.

The routine may proceed to block 621, where the gaming unit 20, 30 waits until the player signals his or her desire to begin the game. The gaming unit 20, 30 may alert the player to the fact that the gaming unit 20, 30 is waiting for the player to indicate his or her desire to begin the game through the use of video images, music, sound effects, etc. or any combination thereof. The player may depress the "Begin" button 608 to start.

If the player has not expressed his or her wish to start at block 621, the routine may determine at block 622 whether the player has requested payout information, such as by activating the "See Pays" button 606, in which case at block 623 the routine may cause one or more pay tables to be displayed on the display unit 70.

If the player has expressed his or her wish to start the game at block 621, then at block 624, the routine may begin deductions from the value total that may have been defined at block 620. To this extent, the comments regarding block 128 may be equally applicable here.

The player may express his or her desire to pause the game at block 625. During the pause, the routine may not assess fee deductions from the value total. Additionally, while not shown in FIG. 17, the player may be permitted to access pay tables as in blocks 622, 623 during the pause. The player may express their wish to pause by, for example, depressing the "See Pays" button 606 and to resume play by depressing the "Begin" button 608.

At block 628, the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by adding, if the bingo game was won, the payout value determined at block 642. The cumulative value or number of credits may also be displayed in the display area 616 (FIG. 16).

At a block 646, a determination is made whether play should be stopped. For example, play may be stopped if the value total becomes equal to zero, or if the player expresses his or her wish to stop play by depressing the "Cash Out" button 604. If the determination is made at block 646 that the play is not to be stopped, the operation returns to block 625. Otherwise, the routine may stop the deductions at a block 648, and may return to the main routine.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:
   at least one display device;
   at least one input device;
   at least one processor; and
   at least one memory device which stores a plurality of instructions, which when executed by the at least one processor, cause the at least one processor to operate with the at least one display device and the at least one input device to:
   (a) if a player inputs a value amount:
      (i) increase an amount of time the player is eligible to play a game, and
      (ii) display to the player a graphical indicator of the amount of time the player is eligible to play the game;
   (b) display to the player a decrease in said amount of time the player is eligible to play the game, wherein said displayed decrease is based on an amount of elapsed time; and (c) if the graphical indicator indicates that the player is eligible to play the game and a determination occurs to trigger the game:
  (i) determine an award for said triggered game, said award being partially based on at least part of said increase of the amount of time the player is eligible to play the game, and
  (ii) display the determined award to the player.

2. The gaming system of claim 1, wherein when executed by the at least one processor, the plurality of instructions cause the at least one processor to display the amount of time the player is eligible to play the game as a group of bars.

3. The gaming system of claim 1, wherein when executed by the at least one processor, the plurality of instructions cause the at least one processor to display a first amount of time the player is eligible to play the game in a first color and display a second amount of time the player is eligible to play the game in a second, different color.

4. A method of operating a gaming system, said method comprising:
(a) if a player inputs a value amount:
  (i) causing at least one processor to execute a plurality of instructions to increase an amount of time the player is eligible to play a game, and
  (ii) causing at least one display device to display to the player a graphical indicator of the amount of time the player is eligible to play the game;
(b) causing the at least one display device to display to the player a decrease in said amount of time the player is eligible to play the game, wherein said displayed decrease is based on an amount of elapsed time; and
(c) if the graphical indicator indicates that the player is eligible to play the game and a determination occurs to trigger the game:
  (i) causing the at least one processor to execute the plurality of instructions to determine an award for said triggered game, said award being partially based on at least part of said increase of the amount of time the player is eligible to play the game, and
  (ii) causing the at least one display device to display the determined award.

5. The method of claim 4, which includes causing the at least one display device to display the amount of time the player is eligible to play the game as a group of bars.

6. The method of claim 4, which includes causing the at least one display device to display a first amount of time the player is eligible to play the game in a first color and causing the at least one display device to display a second amount of time the player is eligible to play the game in a second, different color.

7. The method of claim 4, which is provided through a data network.

8. The method of claim 7, wherein the data network is an internet.

9. The gaming system of claim 1, wherein, when executed by the at least one processor, if a termination event occurs in association with the play of the game and if the graphical indicator indicates an amount of time the player is eligible to play the game, the plurality of instructions cause the at least one processor to:
(a) determine a value based on said indicated amount of time the player is eligible to play the game when the termination event occurs; and
(b) provide the determined value to the player.

10. The gaming system of claim 9, wherein the player causes the termination event to occur.

11. The method of claim 4, which includes, if a termination event occurs in association with the play of the game and if the graphical indicator indicates an amount of time the player is eligible to play the game:
(a) causing the at least one processor to execute the plurality of instructions to determine a value based on said indicated amount of time the player is eligible to play the game when the termination event occurs; and
(b) providing the determined value to the player.

12. The method of claim 11, wherein the player causes the termination event to occur.

13. A non-transitory computer readable medium including a plurality of instructions, which when executed by at least one processor, cause the at least one processor to:
(a) if a player inputs a value amount:
  (i) increase an amount of time the player is eligible to play a game, and
  (ii) cause at least one display device to display to the player a graphical indicator of the amount of time the player is eligible to play the game;
(b) cause the at least one display device to display to the player a decrease in said amount of time the player is eligible to play the game, wherein said displayed decrease is based on an amount of elapsed time; and
(c) if the graphical indicator indicates that the player is eligible to play the game and a determination occurs to trigger the game:
  (i) determine an award for said triggered game, said award being partially based on at least part of said increase of the amount of time the player is eligible to play the game, and
  (ii) cause the at least one display device to display the determined award for said triggered game.

14. The non-transitory computer readable medium of claim 13, wherein when executed by the at least one processor, the plurality of instructions cause the at least one processor to cause the at least one display device to display the amount of time the player is eligible to play the game as a group of bars.

15. The non-transitory computer readable medium of claim 13, wherein when executed by the at least one processor, the plurality of instructions cause the at least one processor to cause the at least one display device to display a first amount of time the player is eligible to play the game in a first color and cause the at least one display device to display a second amount of time the player is eligible to play the game in a second, different color.

16. The non-transitory computer readable medium of claim 13, wherein, when executed by the at least one processor, if a termination event occurs in association with the play of the game and if the graphical indicator indicates an amount of time the player is eligible to play the game, the plurality of instructions cause the at least one processor to:
(a) determine a value based on said indicated amount of time the player is eligible to play the game when the termination event occurs; and
(b) provide the determined value to the player.

17. The non-transitory computer readable medium of claim 16, wherein the player causes the termination event to occur.

* * * * *